United States Patent
Garay et al.

(10) Patent No.: US 6,839,436 B1
(45) Date of Patent: Jan. 4, 2005

(54) METHOD FOR PROVIDING LONG-LIVED BROADCAST ENCRYPTON

(75) Inventors: Juan A. Garay, West New York, NJ (US); Jessica N. Staddon, Redwood City, CA (US); Avishai Wool, Livingston, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 669 days.

(21) Appl. No.: 09/688,490

(22) Filed: Oct. 16, 2000

(51) Int. Cl.$^7$ .............................. H04L 9/00; H04K 1/00

(52) U.S. Cl. ......................... 380/278; 380/44; 380/273; 380/279; 713/163

(58) Field of Search ............................ 380/44–47, 228, 380/239, 270, 273, 277–280; 713/162, 163

(56) References Cited

U.S. PATENT DOCUMENTS

| | | | | | |
|---|---|---|---|---|---|
| 5,325,432 | A | * | 6/1994 | Gardeck et al. | 380/273 |
| 5,361,256 | A | * | 11/1994 | Doeringer et al. | 370/390 |
| 5,592,552 | A | * | 1/1997 | Fiat | 713/163 |
| 6,055,314 | A | * | 4/2000 | Spies et al. | 380/228 |
| 6,094,487 | A | * | 7/2000 | Butler et al. | 380/270 |
| 6,131,160 | A | * | 10/2000 | Dillon et al. | 713/162 |
| 6,463,155 | B1 | * | 10/2002 | Akiyama et al. | 380/278 |
| 6,567,914 | B1 | * | 5/2003 | Just et al. | 713/160 |
| 2002/0129249 | A1 | * | 9/2002 | Maillard et al. | 713/172 |
| 2003/0169885 | A1 | * | 9/2003 | Rinaldi | 380/278 |

OTHER PUBLICATIONS

Wallner et al. Key management for Multicast:Issues and Architectures. Internet Draft, Jun. 1999.*

Kumar et al. "Coding Constructions for Blacklisting Problems without Computational Assumptions," in Advances in Cryptology–Crypto '99, LNCS 1666, pp. 609–623, 1999.*

Gafni et al. "Efficient Methods for Integrating Traceability and Broadcast Encryption" UCLA. Crypto '99, LNCS 1666, pp. 372–387, 1999.*

Decatur et al. "A Probabilistic Error–Correcting Scheme" Internet Draft. Jun. 25, 1997.*

* cited by examiner

*Primary Examiner*—Emmanuel L. Moise

(57) ABSTRACT

A long-lived broadcast encryption method that adapts to the presence of compromised keys and continues to broadcast securely to privileged sets of users over time. In one aspect, a method for providing long-lived broadcast encryption comprises the steps of: allocating, to each of a plurality of subscribers, a corresponding set of subscriber keys; broadcasting encrypted content to the plurality of subscribers using a set of broadcast keys, wherein the encrypted content is decoded by a given subscriber using the subscriber's corresponding set of subscriber keys; modifying the set of broadcast keys, which are used for broadcasting encrypted content, by excluding compromised subscriber keys; and updating a set of subscriber keys corresponding to at least one subscriber when the at least one subscriber's set of subscriber keys comprises an amount of active keys that falls below a first predetermined threshold. In a long-lived broadcast encryption scheme, for any positive fraction $\beta$, a plurality of parameter values may be selected, a priori, in such a way to ensure that a steady state is achieved wherein, at most $\beta$ of the total number of issued cards need to be replaced in a given recording session.

23 Claims, 4 Drawing Sheets

METHOD FOR PROVIDING LONG-LIVED BROADCAST ENCRYPTON

BACKGROUND

1. Technical Field

The present application relates generally to broadcast encryption and, more particularly, to a long-lived broadcast encryption scheme that adapts to the presence of pirate decoders and maintains the security of broadcast to authorized users as encryption keys are compromised over time.

2. Description of Related Art

In general, broadcast encryption (BE) techniques are employed to encrypt digital content to ensure that only privileged users are able to recover the content from an encrypted broadcast. Keys are allocated in such a way that users may be prevented on a short-term basis from recovering the message from the encrypted content. This short-term exclusion of users occurs, for example, when a proper subset of users request to view a movie. The long-term exclusion (or, revocation) of a user is necessary when a user leaves the system entirely.

In practice, broadcast encryption schemes are typically smartcard-based, wherein key material is held in a "tamper-resistant", replaceable smartcard. These smartcards, however, may be used to construct pirate smartcards (or pirate decoders) that allow nonpaying customers to recover content. For instance, a coalition of unscrupulous users may conspire to attack a BE system by breaking open their smartcards to extract the keys and build pirate decoders using the extracted decryption keys, allowing non-authorized, nonpaying users to utilize the pirate decoders to recover the content of encrypted broadcasts.

There are various conventional methods that have been employed to guard against the use of such pirate decoders. For instance, a broadcast encryption scheme may be coupled with a traceability (or traitor tracing) scheme to offer some protection against piracy. The traceability scheme is employed to render the practice of building pirate smartcards risky. This is accomplished by allocating keys to users in such a way that, once such a pirate smartcard is confiscated, at least one of the cards that was used to construct it can be identified.

There are disadvantages associated with such conventional schemes. For instance, traitor tracing schemes are typically designed having x-traceability, wherein it is possible to identify at least one of the smartcards used to construct a given pirate card only if x smartcards, at most, are used to construct the pirate card. Therefore, the security achieved in traceability schemes is limited by the necessity to have a bound on the number of users in a coalition. Another disadvantage associated with traceability schemes, as well as other conventional broadcast encryption schemes, is that they do not take into account the effect of the compromised keys when encrypting the content. Indeed, conventional broadcast encryption schemes do not provide a mechanism for providing continued, secured broadcasting to privileged sets of users after compromised keys that are contained on pirate decoders and/or smartcards of revoked users (whose contract has expired) have been identified. Instead, some schemes require that a private communication be made to each of the remaining users (e.g., over a network) when a single user is revoked in order to maintain the ability to revoke (or exclude) a certain amount of users. In a BE scheme employing smartcards, however, the cost of reprogramming or replacing a large number of cards each time a user is revoked or a pirate smartcard is identified is extremely costly.

Accordingly, a broadcast encryption scheme that is not dependent on the size of the coalition constructing a pirate decoder and that retains an ability to broadcast securely in the presence of pirate smartcards, and consequently, compromised keys, is highly desirable.

SUMMARY OF THE INVENTION

The present invention is directed to a long-lived broadcast encryption method that adapts to the presence of compromised keys and continues to broadcast securely to privileged sets of users over time. In one aspect of the invention, a method for providing long-lived broadcast encryption comprises the steps of: allocating, to each of a plurality of subscribers, a corresponding set of subscriber keys; broadcasting encrypted content to the plurality of subscribers using a set of broadcast keys, wherein the encrypted content is decoded by a given subscriber using the subscriber's corresponding set of subscriber keys; modifying the set of broadcast keys, which are used for broadcasting encrypted content, by excluding compromised subscriber keys; and updating a set of subscriber keys corresponding to at least one subscriber when the at least one subscriber's set of subscriber keys comprises an amount of active keys that falls below a first predetermined threshold.

In another aspect of the invention, the set of subscriber keys allocated to a given user is encoded on a smartcard which is issued to the subscriber. When a pirate decoder is discovered, it is analyzed and the keys it contains are identified. Such keys are called "compromised," and are not used henceforth for broadcasting. Similarly, when a subscriber's contract expires, the subscriber is "excluded," and each of the keys contained on the excluded subscriber's smartcard are considered compromised. The compromised keys are excluded from the broadcast encryption process. Over the course of time, while compromised smartcards are identified, a state may exist in which the number of compromised smartcards (and consequently, the number of compromised keys) reaches a threshold above which secure communication to authorized users is not possible (because the number of active keys on their smartcards fall below a predefined threshold amount). To restore secure broadcast capabilities to such users, their smartcards are replaced with a new smartcard comprising a new set of keys.

In yet another aspect of the invention, a long-live broadcast encryption scheme is reactive, being driven by the card compromises: either due to pirate decoders or the expiration of users' contracts. These card compromises are used to divide time into administrative "epochs" comprising d compromises each. At the end of an epoch, the service provider determines which authorized subscribers require card replacement, and such cards are replaced. Therefore, the primary cost in a long-lived BE scheme according to the present invention is the amount of recarding that is required in each epoch.

In another aspect of the present invention, a long-lived broadcast encryption scheme employs an efficient (short term) randomized broadcast encryption scheme that yields an $(m,\alpha)$-cover-free family to ensures with high probability that any coalition m smartcards can not cover a fraction, a, of the keys contained on another smartcard. A $(\alpha r, |S_p|)$-threshold protocol is used to broadcast to a privileged set P (authorized subscribers) using a set of keys $S_p$, such that a fraction $\alpha$ of a total number of keys r contained on the smartcard of an authorized user is needed to recover the encrypted broadcast content. To render a compromised card useless as a decoder, all the keys contained on the compromised card are excluded from $S_p$, creating a new set $S_p^1$. Thereafter, broadcasting to the privileged set P is performed with an $(\alpha r, |S_p^1|)$-threshold protocol. A recarding session is entered whenever d cards become unavailable. In a recarding session, new values are chosen randomly for all compromised keys, and then any user with less than ar active keys receives a new card. The parameter d in the fixed schedule will be based on the number of compromised users and the desired transmission length.

In yet another aspect of the invention, on or more parameters of a long-lived broadcast encryption scheme can be selected, a priori, to ensure that only a bounded number of users need recarding in each epoch.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

It is to be understood that the system modules and method steps described herein may be implemented in various forms of hardware, software, firmware, special purpose processors, or a combination thereof. In particular, the present invention is preferably implemented as an application comprising program instructions that are tangibly embodied on a program storage device (e.g., magnetic floppy disk, RAM, ROM, etc.) and executable by any device or machine comprising suitable architecture. It is to be further understood that, because some of the constituent system modules and process steps depicted in the accompanying Figures are preferably implemented in software, the actual connections between such components may differ depending upon the manner in which the present invention is programmed. Given the teachings herein, one of ordinary skill in the related art will be able to contemplate these and similar implementations or configurations of the present invention.

Figure 1:
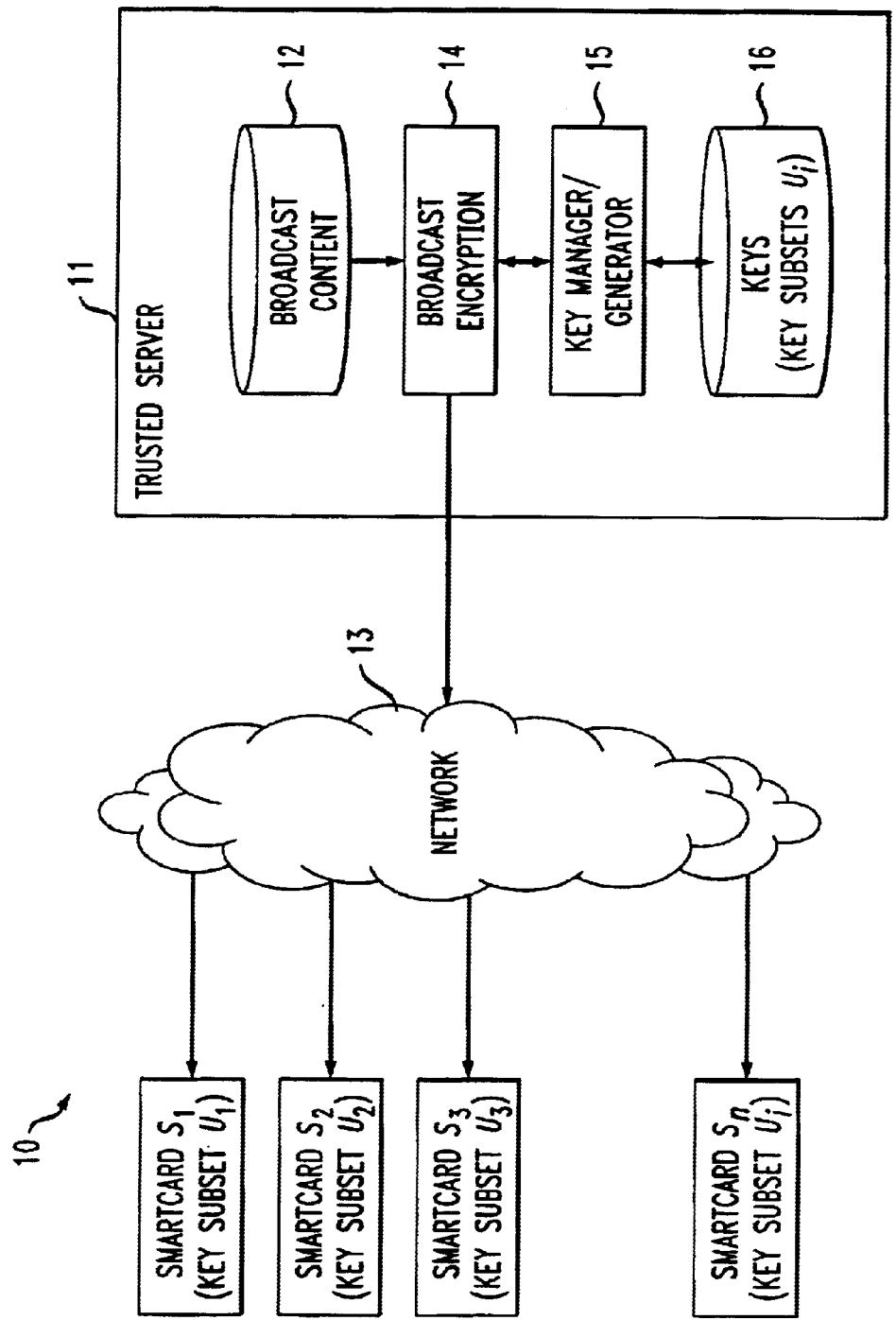
FIG. 1 is a block diagram of a long-lived broadcast encryption system according to an embodiment of the present invention.

Referring now to FIG. 1, a block diagram illustrates a system for providing long-lived BE (broadcast encryption) according to an embodiment of the present invention. In general, a long-lived BE system provides a mechanism for adapting a broadcast encryption scheme to the presence of compromised broadcast encryption keys that are contained on compromised (pirate) smartcards and smartcards of a subscribing user whose membership has expired or has been terminated ("excluded user"). The exemplary system 10 of FIG. 1 comprises a trusted server 11 associated with a service provider of certain broadcast content 12. In general, the trusted server 11 maintains security by authenticating and authorizing subscribers, and transmits encrypted broadcasts to privileged users (authorized subscribers) over a network 13 (e.g., LAN, WAN, Internet, etc). In a preferred embodiment, the service provider issues each subscriber a smartcard $S_1 \ldots S_n$ comprising a set of decryption keys that are used for decoding encrypted broadcasts transmitted from the content provider (e.g., inserting the smartcard in a reader of a set-top box to decrypt a broadcasted event).

In the following discussion, the set of all subscribers/users (privileged and non-privileged/excluded) is denoted $\{u_1, \ldots, u_n\}$, for $i=1 \ldots n$ where subscript n represents a total amount of users. The set of keys associated with the $i^{th}$ user is denoted by $U_i$. Furthermore, a privileged sets of users, denoted P, is of a fixed size n−m, where n represents the set of all users (as indicated above) and m represents a number of users that are non-privileged/excluded (a set of m excluded/non-privileged users is denoted as X).

The trusted server 11 comprises a broadcast encryption module 14 and a key manager/generator module 15, which together, provide a mechanism for long-lived BE according to the present invention. In general, the broadcast encryption module 14 employs a broadcast encryption technique based on symmetric key (or private key) encryption, and a broadcasting protocol for securely distributing broadcast content to a set of privileged users. More specifically, in a preferred embodiment, the broadcast encryption module 14 employs (1) an efficient (short-term) BE scheme (such as a randomized BE scheme described below) that yields an (m, α)-cover free family, and a unicast key between each user and the center; and (2) an $(s, |S_p|)$-threshold protocol to broadcast to a privileged set of users $P=\{u_1 \ldots u_{n-m}\}$, where $S_p$ denotes a set of keys used to broadcast to the privileged set P. If some user is unreachable under the $(s, |S_p|)$-threshold protocol (i.e., as explained below, if too many of the user's keys appear on "dead" cards), then the unicast key will be used to reach that user. It is to be understood that a long-lived BE scheme according to a preferred embodiment of the present invention is an extension of the randomized BE scheme described, for example, in *"Long-Lived Broadcast Encryption,"* by J. Garay, et al., Advances in Cryptology-Crypto '00, Lecture Notes in Computer Science 1880 (2000), pp. 333–352. It is to be understood, however, that (as discussed below) other BE schemes may be employed herein, preferably, BE schemes that are based on cover-free families (cover-free families are described in *"Families of Finite Sets in Which No Set is Covered by the Union of r Others,"* by P. Erdos, et al., Israel Journal of Mathematics 51 (1985), pp. 75–89). BE schemes based on such families are described, for example in *"Efficient Methods for Integrating Broadcast Encryption and Traceability"* by E Gafni, et al., Advances in Cryptology-Crypto '99, Lecture Notes in Computer Science 1666 (1999), pp. 372–387 and *"Coding Constructions for Blacklisting Problems without Computational Assumptions,"* by R. Kumar, et al., Advances in Cryptology-Crypto '99, Lecture Notes in Computer Science 1666 (1999), pp. 609–623. In particular, BE schemes that are tight with the proven lower bounds on the total number of keys in such schemes are preferably employed herein.

In the preferred embodiment employing a simple randomized BE scheme, the key generator/manager module 15 generates, manages and continuously updates a universal set of broadcast encryption keys K that are stored in database 16. For purposes of the following discussion, the universe of keys K (at any given time) in database 16 is denoted by $K=\{k_i, \ldots, k_K\}$, where subscript K denotes a total amount of keys in database 16. In the preferred embodiment, the set of keys K in database 16 comprises a plurality of key subsets $U_1 \ldots U_i$, wherein each key subset $U_i$ is allocated to a corresponding one of the n subscribers $u_1 \ldots u_n$. Each key subset $U_1$ in database 16 comprises r keys that are randomly selected from the set of keys K and allocated to a given subscriber, i.e., $(\forall i, |U_1|=r)$. The subset of keys associated with each subscriber is contained in a respective smartcard $S_1 \ldots S_n$, which is issued to the subscriber by the service provider.

Furthermore, in the preferred embodiment employing a randomized BE scheme, the value of K is selected to ensure an $(m, \alpha)$-cover free family with high probability. More specifically, given the set of keys K comprising a set of key subsets $U=(U_1, \ldots, U_n)$, the set of key subsets comprises an $(m,\alpha)$-cover-free family, if for all $i=1, \ldots, n$, and for all sets of m indices, $\{j_1, \ldots, j_m\}$ not containing i, $|U_i \cap (\cup_{s=1}^{m} U_{js})| \leq (1-\alpha)|U_i|$. A cover free family guarantees that it is impossible for any coalition of m cards to cover an $\alpha$-fraction of key contained on another smartcard. As described in greater detail below, the lower bound on the total number of active keys K (that are stored in database 16) to ensure an $(m, \alpha)$-cover free family with high probability (at least $1-\epsilon$, where $\epsilon$ is any positive fraction) is $$\Omega\left(\frac{n^{(m+1)/(r(1-\alpha)+1)}}{\varepsilon}\right).$$

A detailed proof for this lower bound value for K is provided below.

It is to be understood that the factor of $n^{(m+1)/(r(1-\alpha)+1)}$ in the bound on K is due to the cover-free requirement, that with very high probability it is impossible for m smartcards to cover another smartcard (although the construction itself remains viable for any value of K). Consequently, the BE scheme may require a very large key set K, where the total number of keys K is $\Omega(n^{m/r})$, when $r \geq m$, and $\Omega(n)$, otherwise (see, E. Gafni, et al., *"Efficient Methods for Integrating Broadcast Encryption and Traceability,"* Advances in Cryptology-Crypto '99, Lecture Notes in Computer Science 1666 (1999), pp. 372–387). Indeed, these bounds may well be prohibitive for large user populations.

It is to be appreciated, however, that a long-lived BE scheme according to the present invention remains viable for values of K that fall below the lower bound value. In other words, the cover-free requirement is not necessary for implementing a long-lived BE scheme according to the present invention. Indeed, a cover-free scheme gives no guarantee on the system's behavior after m+1 cards are compromised. In addition, if a randomized attack model is considered (in which pirates pry open randomly selected cards), it is demonstrated (below) that even in a system with significantly fewer keys that an m-cover-free system, a set of m compromised cards will cover another card only with negligible probability. Therefore, in the long-term analysis (and in the experimental results) described below, it is to be appreciated that values of m are not defined and the cover-free requirement is not adhered to for such values. In other words, a long-lived BE scheme according to the present invention guarantees that a coalition of m cards chosen uniformly at random does not cover any other card (with very high probability) using substantially fewer keys as required by a cover-free scheme.

Referring again to FIG. 1, to broadcast encrypted content, the broadcast encryption module 14 preferably employs a broadcasting protocol based on a secret sharing scheme that allows a privileged set of users P to decrypt an encrypted broadcast transmitted from the service provider using the keys contained on their smartcards. In a preferred embodiment, as indicated above, the broadcasting protocol is an $(s,|S_p|)$-threshold protocol which is used to broadcast a message M to a privileged set of users $P=\{u_1 \ldots u_{n-m}\}$, where $S_p$ denotes a set of keys used to broadcast to the privileged set P, and where s $(s=\alpha r)$ denotes the number of keys out of the set $U_i$ of r keys that a user needs to decode encrypted broadcast content. More specifically, with an $(s, |S_p|)$-threshold protocol being used to broadcast to privileged users P, K shares of M $(M_{k1}, M_{k2}, \ldots, M_{kK})$ are created in such a manner that any s of the shares suffices to recover M. The shares corresponding to key held by user in $X=\{u_{n-m+1}, \ldots u_n\}$ are discarded, and each remaining share is encrypted with its corresponding key and these encrypted messages are broadcast to the universe of users. In a preferred embodiment, s=1, which broadcasting protocol is sometimes referred to as an OR protocol as is known in the art. A detailed discussion of threshold protocols can be found, for example, in the article by R. Kumar, et al, entitled: *"Coding Constructions for Blacklisting Problems Without Computational Assumptions,"* Advances in Cryptology-Crypto '99, Lecture Notes in Computer Science 1666 (1999), pp. 609–623 (hereinafter referred to as "Kumar et al.").

Threshold protocols are preferably employed herein as a component of a long-lived BE scheme because of their simplicity and because they yield broadcast encryption schemes with maximal resilience. A scheme is said to be m-resilient if m excluded (i.e., not privileged) users cannot recover the content even by pooling their keys. A broadcast encryption scheme with $(s, |S_p|)$-threshold protocols for every privileged set P, is m-resilient. In addition, the threshold protocols can be efficiently implemented with an error-correcting codes technique as described in Kumar et al. This technique involves generating shares of the content with an error correcting code. Consequently, the shares are much small than with a typical threshold secrete sharing scheme, which results in a much smaller overhead (see D. Stinson, *"Cryptography: Theory and Practice,"* CRC Press, 1995, for a detailed discussion on secret sharing).

Generally, the number of transmissions, t, in a broadcast encryption scheme is the number of keys that are used when encrypting the content. In the preferred embodiment in which the broadcast encryption module 14 implements an $(s, |S_p|)$-threshold protocol to broadcast to a privileged set P, the number of transmissions is $|S_p|=t$.

When using threshold protocols for broadcasting, a user should have sufficiently many keys left after the keys of m other users are excluded to recover the content from the broadcast. Conventionally, this was achieved by allocating keys to users in such a way that the set system is a cover-free family. As indicated above, however, with the long-lived perspective, the cover-free requirement is not a necessary requirement for a long-lived BE scheme according to the present invention. A long-lived BE scheme according to the present invention focuses on how the broadcast encryption scheme is affected by pirate smartcards, which are assumed to be smartcards containing at least r keys, and other unavailable cards (i.e., cards of excluded users). As indicated above, a card may be compromised either because of piracy or simple because a user ceases to be an active subscriber and leaves the system. In either case, the keys on the card become permanently "unavailable" for use as encryption keys. A compromised (pirate) card may be a clone of some user's card or may contain a set of r keys that does not exactly match any of the set of keys of the n users in the system.

Furthermore, it is important to note that a key becomes "unavailable" for encryption use for one of two reasons: (1) the key is on a card belonging to an excluded user; or (2) the key is on a pirate decoder. The keys contained on a compromised smartcard (i.e., a pirate card or the card of an excluded user) are deemed "dead" (the compromised card is also deemed "dead"). On the other hand, a key that is not contained on a compromised card or one of an excluded user is considered "active." A smartcard is considered "clean" if it contains only "active" keys. The number of "dead" cards (i.e., either due to piracy or exclusion) is denoted d. It is to be understood that the reason behind the unavailability of a key has an effect on the BE scheme. When a key is dead because it appears on a compromised card, the key is permanently unavailable; whereas if it simple appears on an excluded user's card, its unavailability may be short term as the excluded user may be a privileged user at a later time.

In general, a long-lived BE method according to one aspect of the present invention for securely broadcasting to privileged users as smartcards become compromised comprises two basic components: (1) adjusting the set $S_p$ of keys that are used to encrypt the broadcast (e.g., by excluding "dead" keys from the set $S_p$ and generating new keys to replace the dead keys) and (2) re-issuing smartcards to users (as necessary) whenever the number of "dead" cards d reaches a predetermined threshold. The long-lived BE method is reactive in the sense that actions are taken in response to the number of compromised smartcards (which, for example, might hamper the continuity of service for privileged users, or bring transmission costs to unacceptable levels). In the preferred embodiment, the expected number of "dead" cards that can be tolerated in the randomized recarding scheme before it is necessary to recard a user is at least $$\left(\frac{K-r}{r}\right)\ln(1/\alpha),$$

or approximately $$\frac{K}{r}$$

dead smartcards (a detailed proof of which is provided below).

In this regard, the long-lived BE scheme of the present invention is divided into "epochs," where each epoch represents a period in which the number of d smartcards has exceeded the predetermined threshold. At the end of epoch i, i=1, 2, . . . , a determination is made as to which smartcards, if any, need replacing, and new cards are issued to the corresponding users. For the long-term analysis, a variable $C_i^j$ denotes the set of smartcards in epoch j that were created in epoch i (note that $C_j^j=\{U_1 \ldots U_n\}$). The following table summarizes the notation used herein.

TABLE 1

$\{u_1, \ldots, u_n\}$ is the set of all users.
$U_i$ is the set of keys held by $u_i$.
$K = \{k_1, \ldots, k_K\}$ is the set of all keys.
$S_P$ is the set of keys used to broadcast to privileged set P.
n is the total number of users.
K is the total number keys.
r the number of keys per user.
t is the number of transmissions. Note that $|S_P| \leq t$.
m is the number of users who are excluded.
d is the number of unavailable (dead) cards at a certain point in time.
$C_i^j$ is the set of cards in epoch j that were created in epoch i.

It is to be appreciated that as indicated above, instead of the preferred randomized BE scheme described herein, the present invention may employ any suitable conventional BE scheme, such as BE schemes based on a cover-free family. For instance, a randomized bucket-based scheme (such as described in Kumar, et al.) or a deterministic BE scheme based on polynomials (such as described in Gafni, et al.) may be extended to a long-lived BE scheme according to the present invention. Both constructions yield (m,α)-cover-free families. In the short term analysis (considering the first epoch), all three schemes are similar in terms of efficiency. The three BE schemes have very similar costs. Each yield (m,α)-cover-free families with high probability when the total number of keys is close to the optimal bound of $n^{m/r}$ keys (this bound is for α=1/r; i.e., no m users cover all another user's keys). In addition, all three schemes can tolerate approximately $$\frac{K}{r}$$

dead cards before recarding is necessary. Since the schemes are so close in terms of efficiency and cost, the simple randomized BE scheme is preferably employed as the basis of a long-lived BE scheme according to the present invention since it is the most simple, as it is entirely random, and it has the advantage over the bucket-based scheme of featuring r and m as independent parameters.

Consequently, the preferred long-lived BE scheme is an extension of the simple randomized BE scheme. As indicated above, the extension is reactive based on card compromises and recarding is performed once every d dead cards. For simplicity, the (m, 1/r)-cover-free family version of the scheme (OR protocols). We emphasize that this analysis is best applied to a stable privileged set of users, or to the entire set of users when m is small. In either case we expect to only have to recard a user when too many of their keys appear on compromised (i.e., permanently unavailable) cards.

The main cost associated with long-lived schemes is the number of cards that must be replaced. As demonstrated below, in the preferred long-live BE scheme, given a positive fraction β(and n, d, and r), at most βn of the cards need to be replaced during any recarding session, provided K and the number of sessions is sufficiently large. This is shown below by the experimental results.

Figure 2:
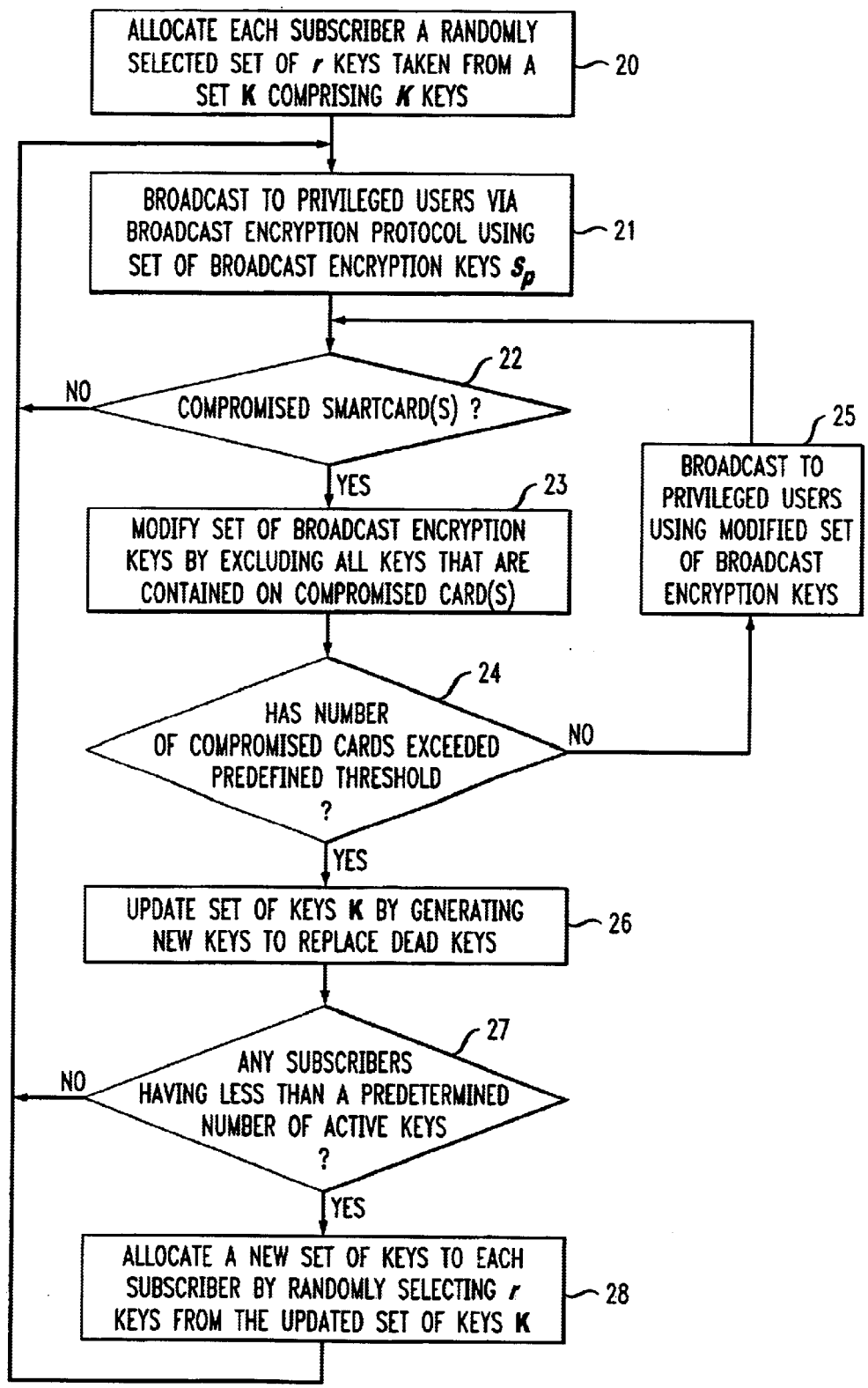
FIG. 2 is a flow diagram of a method for providing long-lived broadcast encryption according to one aspect of the present invention.

Referring now to FIG. 2, a flow diagram illustrates long-lived BE method according to one aspect of the present invention. As indicated above, the long-lived BE method is preferably an extension of an efficient randomized BE method. Initially, each subscriber $u_i$ of the broadcast service is allocated a set of decryption keys $U_i$ (step 20). More specifically, in accordance with the underlying randomized BE scheme, each set of keys $U_i$ is generated by randomly selecting r keys out of a set K comprising K keys. As indicated above, the value K may be selected to ensure that an (m,α)-cover free family is obtained having high probability (where, preferably, α=1/r, i.e., no m users cover all of another user's keys). It is to be noted that $1/r \leq \alpha \leq 1$. In a preferred embodiment, the set of keys $U_i$ are encoded on smartcards, which are then issued to the respective subscribers.

Next, a set of keys $S_p$ are selected (from the set of keys K) to broadcast to a privileged set of users P (step 21). As indicated above, a preferred broadcasting protocol is an (αr, $|S_p|$)-threshold protocol, wherein a share is created for each key in the set $S_p$ according to a (αr, $|S_p|$)-threshold secret sharing scheme (s=αr=1 denotes the number of keys out of r that are needed to decode the content) and each share is encrypted with its corresponding key. In a preferred embodiment, s=1.

Over the course of time, one or more of the decryption keys that have been issued to the subscribing users may become compromised. As indicated above, a key is deemed compromised (dead) if it is contained on a pirate smartcard or a smartcard of a subscribing user whose contract with the service provider has expired or been terminated (i.e., an excluded user). In addition, each pirate smartcard or smartcard belonging to an excluded user is considered dead. Therefore, when a pirate smartcard is discovered, it is analyzed and all the keys it contains are identified and deemed dead. Likewise, every key contained on an excluded user's smartcard are deemed dead.

Accordingly, over the course of time, as compromised smartcards (pirate smartcards or smartcards of excluded users) are identified (affirmative result in step 22), to render such compromised/excluded cards useless, every key contained on such cards are deemed dead and, consequently, excluded from the set of keys $S_p$ which is used to broadcast to privileged users (step 23), thereby creating a new set $S_p^1$ (an so on). Thereafter, broadcasting to privileged users is performed via a (αr, $|S_p^1|$) threshold protocol (and so on). The identified pirate smartcards and smartcards belonging to an excluded user are deemed "dead" or "unavailable."

After compromised smartcards have been identified and deemed "dead", a determination is made as to whether the amount of "dead" smartcards d (at the given time) has met a predefined threshold (step 24). As indicated above, in a preferred embodiment, the expected number of dead cards d that can be tolerated before recarding is needed is at least $$\left(\frac{K-r}{r}\right)\ln(1/\alpha).$$

If the number of dead cards d has not met the predefined threshold (negative determination in step 24), then the latest modified set of encryption keys (e.g., $S_p^1$) will be used to encrypt the content broadcast to privileged users (step 25). Thereafter, additional compromised smartcards may be identified over the course of time, resulting in continued modification (i.e., exclusion of the compromised keys) of the current set of keys used to encrypt the broadcast content (steps 22 and 23 are repeated).

On the other hand, if it is determined that the amount of dead cards d has met the predefined threshold (affirmative determination in step 24), a recarding session is performed. As indicated above, in a preferred embodiment, a recarding session is performed once for each "epoch", wherein each epoch is a time period when the number of dead cards d meets the predefined threshold. In a preferred embodiment, a recarding session comprises updating the set of keys K by generating new keys to replace the dead keys (step 26). More specifically, let Z be the set of dead keys (i.e., all the keys contained on the identified pirate and excluded smartcards) and let z=|Z|; note that z≤dr. The update step comprises discarding all the keys in Z, and generating z new keys so that the resulting number of keys in the universal key set K is again K in total. The new set of all keys becomes K'=(K\Z)∪Z'. In short, new keys are generated for all dead keys, and active keys are unchanged. The total number of active keys (i.e., keys that need to be stored by the broadcasting center (in database 16)) is unaffected by the recarding procedure.

The next step in the preferred recarding session is to determine if any (current) subscribers have less than a predetermined number of active keys on their smartcards (step 27). More specifically, in the preferred embodiment, a determination will be made as to whether there are any users having a current smartcard that contains less than αr active keys (preferably, s=αr=1 and, therefore no active keys). Each user having a smartcard with less than the predefined number of active keys (e.g., 0 active keys) will be recarded. Recarding comprises the steps of allocating a new set of r keys by randomly selecting such keys from the updated set K of K keys (step 28) and encoding the new keys on a new smartcard, which is then mailed to the user.

As indicated above, a key is considered dead either because it belongs to an excluded user or is on a compromised card. In the former case, the key is unavailable on what may be a short term basis, as an excluded user may well be a privileged user at another time. Hence, it is to be appreciated that the long term analysis described herein is best applied to a stable privileged set P, or to the whole set of users when the number of excluded users, m, is small. Given this, it is very likely that users will only be recarded when more than (1−α)r of their keys are permanently unavailable (i.e., contained in compromised cards) rather than simply temporarily unavailable, due to the current set of excluded users. Indeed, the primary motivation for recarding users is the presence of compromised (pirate) cards.

Figure 3:
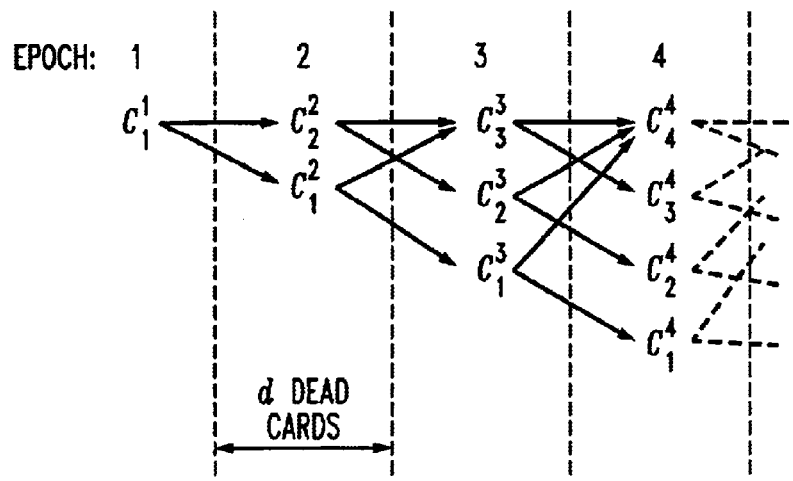
FIG. 3 is a diagram illustrating different periods (epochs) of a randomized broadcast encryption scheme according to one aspect of the present invention.

It is to be appreciated that the recarding process (steps 26, 27 and 28) depicted in FIG. 2 is repeated for each epoch (i.e., for each affirmative result in step 24). As keys get compromised and smartcard are reissued to users, the users are partitioned into sets of users with cards with fresh keys, and users with cards containing keys some of which are dead. This process is depicted in FIG. 3. Recall that $C_i^j$ represents the set of smartcards in epoch j that were created in epoch i. Initially in epoch 1, $C_1^1 = \{U_1, \ldots, U_n\}$. In a recarding session in epoch 2, selecting (randomly) d dead cards from $C_1^1$ yields $C_2^2$, the set of users that need to be recarded, as well as $C_1^2 = C_1^1 \backslash C_2^2$; in epoch 2, selecting d random cards from $C_1^2$ and $C_2^2$ yields $C_3^3$ as well as $C_1^3$ and $C_2^3$; and so on. As described in detail below, there comes a time in which steady state is reached where only a bounded number of users $C_j^j$ need to be recarded in any epoch. A detailed proof of this steady state condition is provided below, along with an empirical analysis.

Proofs

Lemma 1. As indicated above, the lower bound on the total number of active keys K (that are stored in database 16) in the randomized BE scheme to ensure an (m, α)-cover free family with high probability (at least 1−ε, where ε is any positive fraction) is $$\Omega\left(\frac{n^{(m+1)/(r(1-\alpha)+1)}}{\varepsilon}\right).$$

This lower bound value is derived as follows.

Consider $m+1$ users, $u, u_1, u_2, \ldots, u_m$. First we bound the probability that $u_i, \ldots, u_m$ cover more than $(1-\alpha)r$ of u's keys. Since $|\cup_{i=1}^m U_i| \leq mr$, we have the following bound:

$$Pr\left(\left|U \cap \left(\bigcup_{i=1}^m U_i\right)\right| > (1-\alpha)r\right) \leq$$

$$\frac{\binom{mr}{(1-\alpha)r+1}\binom{K-(1-\alpha)r-1}{\alpha r-1} +}{\binom{K}{r}}$$
$$\frac{\binom{mr}{(1-\alpha)r+2}\binom{K-(1-\alpha)r-2}{\alpha r-2} + \ldots + \binom{mr}{r}}{\binom{K}{r}}$$

Using binomial bounds and simplifying, we have:

$$Pr\left(\left|U \cap \left(\bigcup_{i=1}^m U_i\right)\right| > (1-\alpha)r\right) \leq \frac{(rem)^r e^{\alpha r-1} \alpha r}{K^{r(1-\alpha)+1}}$$

Hence, the probability that $|U \cap (\cup_{i=1}^m U_i)| \leq \alpha r$ is at least $$1 - \frac{(rem)^r e^{\alpha r-1} \alpha r}{K^{r(1-\alpha)+1}}.$$

There are $n-m$ privileged users, therefore the probability that there is at least one privileged user who shares more than $r(1-\alpha)$ keys with $u_1, \ldots, u_m$, is at most $$1 - \left[1 - \frac{(rem)^r e^{\alpha r-1} \alpha r}{K^{r(1-\alpha)+1}}\right]^{n-m}.$$

To account for all possible excluded sets of m users, it suffices to multiply by $$\binom{n}{m}:$$

$$\binom{n}{m}\left(1 - \left[1 - \frac{(rem)^r e^{\alpha r-1} \alpha r}{K^{r(1-\alpha)+1}}\right]^{n-m}\right)$$

Substituting a binomial approximation, $$1 - \left(\frac{m}{ne}\right)^m \varepsilon \leq \left[1 - \frac{(rem)^r e^{\alpha r-1} \alpha r}{K^{r(1-\alpha)+1}}\right]^{n-m}$$

If $K > r^{r+1} m^r e^{2r-1}$ (this is reasonable since we expect r to be small), then we can use the fact that $(1-x)^{n-m} \geq 1-(n-m)x$ when $x \leq 1$, to simplify this expression. With this substitution, it suffices to show the following:

$$(n-m)\left[1 - \frac{(rem)^r e^{\alpha r-1} \alpha r}{K^{r(1-\alpha)+1}}\right] \leq \left(\frac{m}{ne}\right)^m \varepsilon$$

Solving for K yields the statement of Lemma 1.

Lemma 2: As indicated above, the expected number of dead cards d that can be tolerated in the randomized recarding scheme before it is necessary to recard a user is at least $$\left(\frac{K-r}{r}\right)\ln(1/\alpha).$$

This value of d is derived as follows.

The probability that a fixed key k is not held by a randomly chosen user is $$\left(1 - \frac{r}{K}\right)^d.$$

Therefore the expected number of keys that a user shares with d dead cards is, $$r\left(1 - \left(1 - \frac{r}{K}\right)^d\right)$$

(it is to be understood that because the long-lived BE scheme is completely random, we do not need to distinguish between cloned cards and non-cloned cards). We want to determine the values of d for which it is expected that recarding is necessary:

$$r\left(1 - \left(1 - \frac{r}{K}\right)^d\right) > (1-\alpha)r$$

$$d > \frac{\ln(1/\alpha)}{\ln\left(1 + \frac{r}{K-r}\right)}$$

using the fact that $$\ln\left(1 + \frac{r}{K-r}\right) \leq \frac{r}{K-r},$$

the statement of Lemma 2 follows.

The next proof sets forth the bounds on the number of smartcards that need to be replaced in each epoch, namely, the (expected) size of set $C_j^j$ in epoch j. Initially, we first prove recurrence relations relating the expected number of cards in epoch j that were created in epoch $i \leq j$, $$E(|C_i^j|).$$

Lemma 3: In the randomized long-lived BE scheme with $\alpha = 1/r$ and a fixed recarding schedule of once every d dead cards, the following equations hold for all $i \geq 1$:

1. $E(|C_{i+1}^{i+1}|) \leq \sum_{j=1}^{i} E(|C_j^i|)\left[1 - \left(1 - \frac{r}{K}\right)^{(i+1-j)d}\right]^r$ 2. $\forall j, 1 \leq j \leq i, E(|C_j^{i+1}|) = E(|C_j^i|)\left(1 - \left[1 - \left(1 - \frac{r}{K}\right)^{(i+1-j)d}\right]^r\right)$ The foregoing inequalities are derived as follows. To see the first inequality, note that if a user is recarded (or created)

in epoch j, then during the time interval from the beginning of epoch j to the end of epoch i, d(i+1−j) randomly chosen cards become unavailable. If these cards cover the user's card, then the user must be recarded. Due to the random nature of the scheme, a user is covered with probability, $$\left[1-\left(1-\frac{r}{K}\right)^{(i+1-j)d}\right]^r.$$

We have a weak inequality rather than equality, because a user may be covered by fewer than d(i−j+1) cards.

The second equation is obtained by noting that all users who were recarded (or created) in epoch j, and who are not covered by the end of epoch i, become the set of users $C_j^{i+1}$.

The inequalities from Lemma 3 are now used to perform an analysis that demonstrates that the long-lived BE scheme reaches a steady state in which only a bounded number of cards need to be replaced in each epoch. More specifically, the inequalities of Lemma 3 can be used to demonstrate (via approximate analysis) that an upper bound on the number of recards per epoch holds in the limit, and that this upper bound can be made small through appropriate choices of K, r and d. This analysis comprises three components. First, given fixed valued of the parameters, there exists an integer $l_1$, such that the probability that a card is covered (and hence, needs to be refreshed) within $l_1$ epochs, is negligible. The intuition for this result is that if a card has been refreshed recently, then it is unlikely that it will be covered again within a small number of epochs. This result indicates that the contribution to $E(|C_{i+1}^{i+1}|)$ from the first $l_1$ terms of inequality 1 of Lemma 3 above is fairly small. Secondly, the later terms in inequality 1 may also not contribute much to the upper bound on $E(|C_{i+1}^{i+1}|)$. In particular, there exists an integer, $l_2$, (greater than $l_1$), such that it is unlikely that a card will not be covered within $l_2$ epochs. Note that this implies that when $i-j \geq l_2$, $E(|C_j^i|)$ is fairly small, and hence, will not contribute much to the upper bounds on $E(|C_{1+1}^{i+1}|)$. Lastly, $l_1$ and $l_2$ are on the order of K/rd, hence the dominating terms are those for which i−j is Θ(K/rd), and this leads to an approximation for the upper bound of the steady state recard rate, β. The following proof demonstrates this analysis in detail.

Lemma 4: Assume n, K, r, d and ϵ>0 are given, the following are true:

1. If $$\ell_1 \in O\left(\frac{\varepsilon^{1/r}K}{rd}\right),$$

then the probability that a card is covered within $l_1$ epochs is less than ϵ.

2. If $$l_2 \in \Omega\left(\frac{(1-\varepsilon)^{1/r}K}{rd}\right),$$

then the probability that a card survives for more than $l_2$ epochs before it is covered is less than ϵ.

3. If i−j∈Θ(K/rd), then the coefficient of $E(|C_j^i|)$ in inequality 1 of the above Lemma 3 is approximately $$\left(1-\left(\frac{1-r/K}{e^c}\right)^d\right)^r,$$

where c is a constant.

The proof is as follows:

1. The probability that a card is covered by $dl_1$ randomly chosen cards is $(1-(1-r/k)^{dl_1})^r$. Setting this quantity less than ϵ and solving for $l_1$ yields $$l_1 < \frac{\ln(1-\varepsilon^{1/r})}{d\ln(1-r/K)}.$$

2. The probability that a card is not covered within $l_2$ epochs is $(1-(1-r/k)^{dl_2})^r$. Setting this quantity less than ϵ and solving for $l_2$ yields $l_2 1(k/rd(1-\epsilon)1/r)$ 3. Assuming that $$i-j = \frac{cK}{rd}$$

for some constant c, we'll bound the contribution of $$i-j = \frac{cK}{rd}$$

to the inequality in Lemma 3 (i.e., we'll bound the coefficient of $E(|C_j^i|)$)-given the earlier results, this bound is an approximate upper bound to β, the long term steady state. When $$i-j = \frac{cK}{rd}, \text{ the coefficient of } E(|C_j^i|) \text{ is } \left(1 - ((1-r/K)^d)^{cK/rd+1}\right)^r.$$

the coefficient of $E(|C_j^i|)$ is $(1-((1-r/K)^d)^{cK/rd+1})^r$. When K is sufficiently large, this is the order of $$\left(1-\frac{(1-r/K)^d}{e^c}\right)^r.$$

When combined with parts 1 and 2, part 3 of this Lemma indicates that the steady state recard rate β should decrease with K (which agrees with the experimental results that follow). The quantity also increases with d, which agrees with the basic intuition that the longer we wait to recard, the more recarding we will have to do.

Experimental Results

The following experiments illustrate the dynamics of smartcard replacement in accordance with a long-lived BE scheme according to the present invention and corroborate the steady state claim. In these experiments, equation 1 of Lemma 3 was evaluated (assuming an equality rather than an inequality) for a variety of parameter settings to track the number of cards that were issued in every epoch. Furthermore, we focused on the random attack model, and assumed that, in each epoch, the dead cards d are selected uniformly at random from the set of user cards. As indicated above, a long-lived BE scheme according to the present invention guarantees that a coalition of m cards chosen uniformly at random does not cover any other card (with very high probability) using substantially fewer keys. Thus, in the long-term analysis, and in the following simulation, we did not adhere to the cover-free requirement and, consequently, the value of K was not constrained by the bound of Lemma 1. Instead we de-coupled the number of users n from the total number of keys K number, and observed the behavior of the resulting schemes in terms of how any cards need to be issued per epoch, and let K be a free parameter which we varied.

To justify this decoupling of K from n, we present the following lemma that provides a lower bound on K such that with high probability, none of the n user cards are covered by d randomly chosen compromised cards (i.e., some cover-freeness is achieved with high probability). As mentioned above, this lower bound may be much smaller that the size of K in a d-cover-free family.

Lemma 5: Assume $\epsilon>0$, n, r and d are given. If $K>r/c$, where c is a constant that depends on $\epsilon$, n, r and d, then the probability that any user's card is covered by d randomly chosen cards is less than $\epsilon$; The proof is as follows.

The probability that n (randomly chosen) user's cards are not covered by d randomly chosen cards is $[1-(1-(1-r/K)^d)^r)]^n$. Hence, we solve the following inequality for K, $[1-(1-(1-r/K)^d)^r)]^n 11-\epsilon$, which yields $$K > \frac{r}{1-(1-[1-(1-\varepsilon)1/n]^{1/r})^{1/d}}.$$

As an example, for the values of n, r and d used in FIG. 4 below, and $\epsilon=0.1$, the above Lemma 4 give a lower bound on K of approximately 69, which is far less than the lower bound of approximately $10^{10}$ for a d-cover-free family.

In each of the following experiments, the user population was set to a size n=100,000, which is viewed as being on the low end of real population sizes. The card capacity r ranged between 10 and 50, which is realistic for current smartcards with 8 KB of memory and keys requiring, say, 64 bytes each including overhead. The epoch length was varied to be $10 \leq d \leq 50$ dead cards. The number of key was varied between $1000 \leq K \leq 5000$, which values are smaller than the number of keys required by Lemma 1, which calls for $K \geq n^{m/r}$ keys (note the dependency on m, the number of users the underlying BE is able to exclude)

Figure 4:
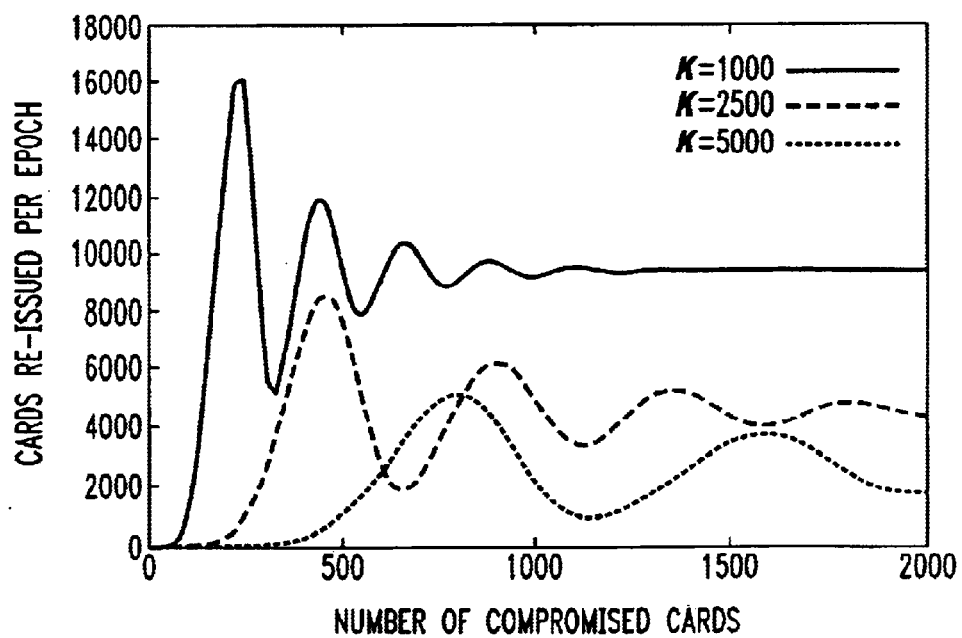
FIG. 4 is a graphical diagram illustrating experimental results of smartcard replacement based on different values of the total number of keys in a long-lived broadcast encryption scheme according to one aspect of the present invention.

FIG. 4 is a diagram that illustrates the dynamics of the card reissue strategy, and the effect of the total number of keys K. More specifically, FIG. 2 illustrates 3 curves each showing the number of cards that are reissued per epoch for n=100,000, d=20, for values of K=1000, 2500 and 5000, respectively. We see that each curve begins with oscillations. In the first epoch (d=20) of each curve, we see that no cards are re-issued (since the first dead cards do not cover any user). But after a certain number $d_c$ of dead cards are discovered, enough keys are compromised and there is a rapid increase in card reissue. This in turn "cleans" the card population and, as shown, the card reissue rate drops. We see that the oscillations are dampened and a steady state appears fairly quickly, especially for higher values of K.

Indeed, as is shown in FIG. 4, the parameter K affects several aspects of the dynamics: the first card reissue point $d_c$ of each curve occurs later as K increases ($d_c \approx 40$ for K=1000 whereas $d_c \approx 200$ for K=5000). In addition, as K increases, the curve oscillations are gentler, have a smaller amplitude and lower peak rate. Most importantly, the steady state rate of card reissue is lower for larger K. For instance, steady state occurs at $\approx 9400$ cards per epoch for K=1000, whereas steady state occurs at $\approx 2000$ cards per epoch for K=5000. Overall, we see that increasing K improves all the aspects of the reissue strategy. Therefore, it is preferable to use the largest possible K that is within the technological requirements.

Figure 5:
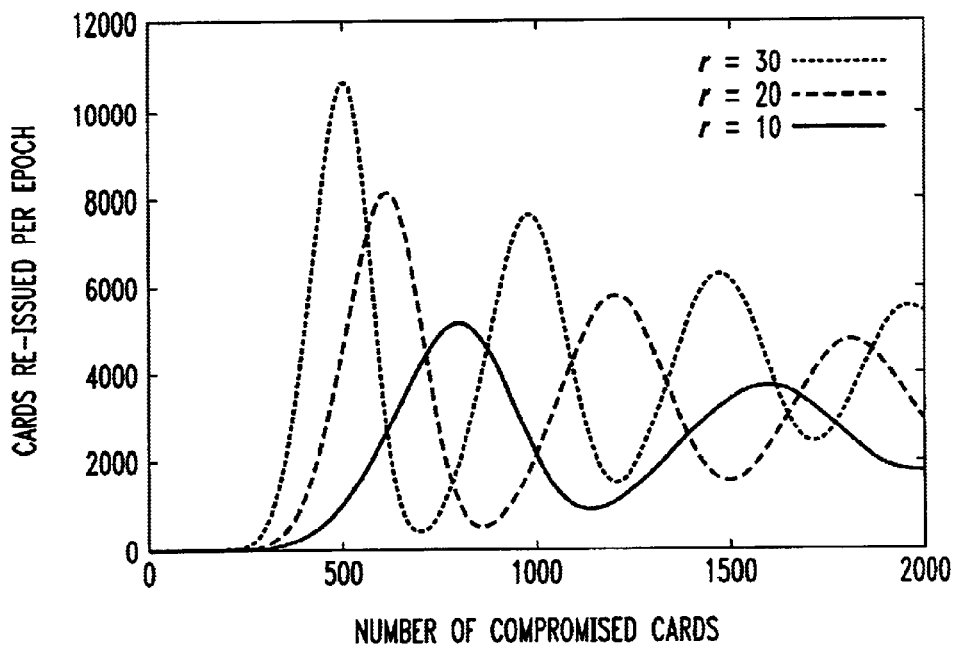
FIG. 5 is a graphical diagram illustrating experimental results of smartcard replacement based on different values of the number of keys per smartcard in a long-lived broadcast encryption scheme according to one aspect of the present invention.

Next, FIG. 5 is a diagram that illustrates the effect of increasing the card capacity r. More specifically, FIG. 5 illustrates three curves representing the number of cards reissued per epoch, with n=100,000, K=5000 and d=20, for values of r=30, 20 and 10. We can see that as the value of r increases, the cost of card reissue increases: the curves having larger values for r result in higher steady state reissue rates and higher peak reissue rates. This is consistent with the fact that as re increases, we expect each key to be contained in more cards, so the effect of a compromised key is more widespread. In addition, as indicated above, we expect to have to recard users sooner when r is large (and K is fixed). Having a smaller r, however, means that the expected transmission length would be longer; at the extreme, setting r=1 would give optimal reissue rates (no cards need to be reissued), with very long transmissions.

Figure 6:
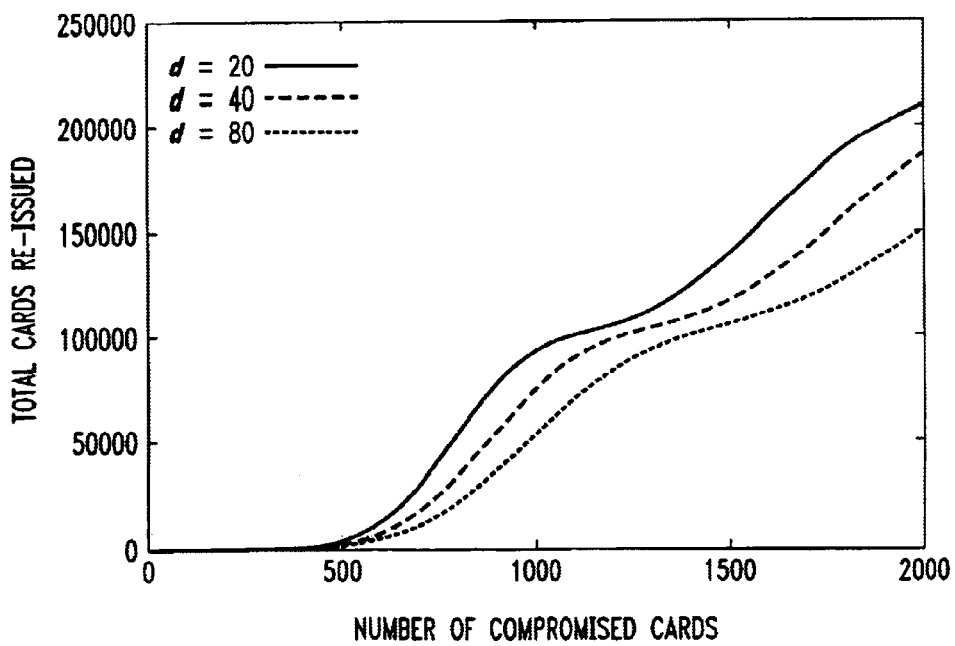
FIG. 6 is a graphical diagram illustrating experimental results of smartcard replacement based on different values of epoch length in a long-lived broadcast encryption scheme according to one aspect of the present invention.

Next, FIG. 6 illustrates the effect of increasing the epoch length d. More specifically, FIG. 6 illustrates three curves representing the accumulated total number of reissued cards, with n=100,000, K=5000 and r=10, for epoch lengths d=20, 40 and 80. FIG. 6 illustrates that a longer epoch length results in a smaller total number of reissued cards. On the other hand, as the length of the epoch increases, the number of compromised keys during each epoch increases, thereby possibly resulting in many users not being broadcasted to securely (in the absence of unicasts). Consequently, the recording costs and transmission costs may influence the choice of d.

In summary, a long-lived broadcast encryption method according to the present invention provides a mechanism for adapting broadcast encryption to the presence of pirate decoders and maintaining the security of broadcasts to privileged users while rendering all pirate decoders useless. A long-lived broadcast encryption scheme is a more comprehensive solution to piracy than conventional methods such as traitor tracing schemes, because the latter only seek to identify the makers of pirate decoders and do not provide a mechanism for maintaining secured broadcasts once keys have been compromised. Indeed, one fundamental difference between a long-lived BE scheme as described herein and conventional techniques is that the long-live BE scheme seeks to minimize the amount of communication (recarding) that is needed by adapting to the presence of compromised cards (or equivalently, revoked users) by removing the keys contained on a pirate decoder (or revoked user's cards) from the encryption process. Consequently, a long-lived BE scheme as described herein is a more efficient long-term solution than conventional revocation schemes because is minimized the amount of recarding that must be done in the long-term.

In addition, as described above, although a conventional broadcast encryption scheme may only be designed to allow any set of m users to be excluded, a long-lived BE scheme according to the present invention can tolerate a high number of compromised cards (in addition to the m excluded cards) before any users need to be recarded. Indeed, through an appropriate choice of parameters, the affected number of users (who need to be recarded in a given epoch during steady state) can be a small fraction of the total number of users. That is, for a long-lived broadcast encryption scheme according to the present invention, for any positive fraction $\beta$, the parameter values may be selected, a priori, in such a way to ensure that eventually, at most $\beta$ of the n cards must be replaced in each epoch.

Although illustrative embodiments have been described herein with reference to the accompanying drawings, it is to be understood that the present system and method is not limited to those precise embodiments, and that various other changes and modifications may be affected therein by one skilled in the art without departing from the scope and spirit of the invention. It is to be understood that all such changes and modifications are intended to be included within the scope of the invention as defined by the appended claims.

What is claimed is:

1. A broadcast encryption method, comprising the steps of:
   allocating, to each of a plurality of subscribers, a corresponding set of subscriber keys;
   broadcasting encrypted content to the plurality of subscribers using a set of broadcast keys, wherein the encrypted content is decoded by a given subscriber using the subscriber's corresponding set of subscriber keys;
   modifying the set of broadcast keys, which are used for broadcasting encrypted content, by excluding compromised subscriber keys; and
   updating a set of subscriber keys corresponding to at least one subscriber when the at least one subscriber's set of subscriber keys comprises an amount of active keys that falls below a first predetermined threshold.

2. The method of claim 1, wherein each set of subscriber keys is encoded on a smartcard that is issued to the corresponding subscriber.

3. The method of claim 2, further comprising the steps of:
   identifying a compromised smartcard; and
   identifying each subscriber key contained on the compromised smartcard as a compromised key.

4. The method of claim 3, wherein a compromised smartcard comprises one of a pirate smartcard and a smartcard of an excluded subscriber.

5. The method of claim 4, wherein the step of updating comprises the steps of:
   tracking a total amount of compromised cards; and
   reissuing a smartcard comprising the updated set of subscriber keys when the total amount of compromised cards meets a second predefined threshold.

6. The method of claim 1, wherein the first predetermined threshold is one key.

7. A broadcast encryption method, comprising the steps of:
   allocating a set of subscriber keys to each of a plurality of n subscribers, wherein each set of subscriber keys is generated by randomly selecting r keys from a universal set comprising K keys;
   broadcasting encrypted content to the n subscribers using a set of broadcast keys $S_p$ selected from the universal set of keys;
   identifying at least one compromised subscriber key;
   adjusting $S_p$ by excluding the at least one compromised subscriber key; and
   updating a set of subscriber keys corresponding to at least one subscriber when the at least one subscriber's set of subscriber keys comprises an amount of active keys that falls below a first predetermined threshold.

8. The method of claim 7, wherein the step of allocating is performed using a randomized broadcast encryption scheme wherein K is selected to ensure an $(m,\alpha)$ cover free family with high probability that the sets of subscriber keys corresponding to a coalition of m subscribers can not cover a fraction $\alpha$ of r keys comprising the set of subscriber keys of another subscriber.

9. The method of claim 8, wherein the step of broadcasting is performed using an $(\alpha r, |S_p|)$-threshold broadcast protocol.

10. The method of claim 9, wherein $\alpha r=1$.

11. The method of claim 7, wherein each set of subscriber keys is encoded on a separate smartcard that is issued to the corresponding subscriber.

12. The method of claim 11, wherein the step of identifying at least one compromised subscriber key comprises the steps of:
   identifying a compromised smartcard; and
   identifying each subscriber key contained on the compromised card as a compromised key.

13. The method of claim 12, wherein a compromised smartcard comprises one of a pirate smartcard and a smartcard of an excluded subscriber.

14. The method of claim 12, wherein the step of updating comprises the steps of:
   tracking a total amount of compromised smartcards; and
   reissuing a smartcard comprising the updated set of subscriber keys when the total amount of compromised cards meets a second predefined threshold d.

15. The method of claim 14, wherein d is substantially equal to K/r.

16. The method of claim 14, wherein the step of reissuing comprises the steps of:
   generating a new key for each compromised key to update the universal set of keys; and
   randomly selecting r keys from the updated universal set of keys to generate the updated set of subscriber keys.

17. The method of claim 14, wherein K, r and d are selected to obtain a bound on the number of subscribers that are reissued smartcards in recarding sessions.

18. A program storage device readable by a machine, tangibly embodying a program of instructions executable by the machine to perform method steps for performing broadcast encryption, the method steps comprising:
   allocating, to each of a plurality of subscribers, a corresponding set of subscriber keys;
   broadcasting encrypted content to the plurality of subscribers using a set of broadcast keys, wherein the encrypted content is decoded by a given subscriber using the subscriber's corresponding set of subscriber keys;
   modifying the set of broadcast keys, which are used for broadcasting encrypted content, by excluding compromised subscriber keys; and
   updating a set of subscriber keys corresponding to at least one subscriber when the at least one subscriber's set of subscriber keys comprises an amount of active keys that falls below a first predetermined threshold.

19. The program storage device of claim 18, further comprising instructions for performing the step of:
   identifying each subscriber key contained on a compromised smartcard as a compromised key.

20. The program storage device of claim 19, wherein the instructions for performing the step of updating comprise instructions for performing the steps of:
   tracking a total amount of compromised cards; and
   encoding a smartcard with the updated set of subscriber keys when the total amount of compromised cards meets a second predefined threshold.

21. The program storage device of claim 18, wherein the first predetermined threshold comprises one key.

22. A program storage device readable by a machine, tangibly embodying a program of instructions executable by the machine to perform method steps for broadcast encryption, the method comprising the steps of:

allocating a set of subscriber keys to each of a plurality of n subscribers, wherein each set of subscriber keys is generated by randomly selecting r keys from a universal set comprising K keys;

broadcasting encrypted content to the n subscribers using a set of broadcast keys $S_p$ selected from the universal set of keys;

identifying at least one compromised subscriber key;

adjusting $S_p$ by excluding the at least one compromised subscriber key; and updating a set of subscriber keys corresponding to at least one subscriber when the at least one subscriber's set of subscriber keys comprises an amount of active keys that falls below a first predetermined threshold.

23. The program storage device of claim 22, wherein the instructions for performing the step of allocating comprise instructions for performing a randomized broadcast encryption scheme wherein K is selected to ensure an (m, α) cover free family with high probability that the sets of subscriber keys corresponding to a coalition of m subscribers can not cover a fraction α of r keys comprising the set of subscriber keys of another subscriber.

* * * * *